United States Patent [19]
Bergmann et al.

[11] Patent Number: 5,885,706
[45] Date of Patent: Mar. 23, 1999

[54] TRANSPARENT, STATIC-DISSIPATIVE FORMULATIONS FOR COATINGS

[75] Inventors: Oswald Robert Bergmann, Wilmington; Carol Annona Brevett, Bear; Carl Brent Douglas, Claymont; Peter Chungwai Szeto, Wilmington, all of Del.

[73] Assignee: E. I. du Pont de Nemours and Company, Wilmington, Del.

[21] Appl. No.: 779,065

[22] Filed: Jan. 7, 1997

Related U.S. Application Data

[62] Division of Ser. No. 292,668, Aug. 18, 1994, Pat. No. 5,631,311.

[51] Int. Cl.⁶ .................................. B32B 5/16; H01B 1/20
[52] U.S. Cl. ...................... 428/323; 428/411.1; 428/412; 428/426; 428/457; 428/480; 428/523; 428/532; 252/500; 524/284; 524/408; 524/410; 524/414; 524/439; 524/910; 524/912
[58] Field of Search .................... 428/323, 411.1, 428/412, 426, 457, 480, 523, 532; 252/500; 523/200, 333; 524/81, 284, 401, 408, 410, 414, 439, 910, 912

[56] References Cited

U.S. PATENT DOCUMENTS

| | | | |
|---|---|---|---|
| 2,085,177 | 6/1937 | Zschiegner | 23/230 |
| 4,431,764 | 2/1984 | Yoshizumi et al. | 524/409 |
| 4,571,361 | 2/1986 | Kawaguchi et al. | 428/328 |
| 4,705,647 | 11/1987 | Yamaguchi et al. | 252/512 |
| 4,734,319 | 3/1988 | Doi et al. | 428/216 |
| 4,959,516 | 9/1990 | Tighe et al. | 219/10.55 F |
| 5,014,849 | 5/1991 | Becker | 206/328 |
| 5,051,209 | 9/1991 | Mirabeau et al. | 252/518 |
| 5,068,063 | 11/1991 | Tremper, III | 252/518 |
| 5,071,676 | 12/1991 | Jacobson | 427/214 |
| 5,104,583 | 4/1992 | Richardson | 252/518 |
| 5,107,989 | 4/1992 | Becker | 206/328 |
| 5,118,578 | 6/1992 | Berger et al. | 428/413 |
| 5,126,763 | 6/1992 | Atherton et al. | 346/135.1 |
| 5,204,177 | 4/1993 | Sato et al. | 428/328 |
| 5,208,103 | 5/1993 | Miyamoto et al. | 428/354 |
| 5,236,737 | 8/1993 | Linton | 427/126.3 |
| 5,284,705 | 2/1994 | Cahill | 428/328 |
| 5,411,792 | 5/1995 | Yukinobu et al. | 428/212 |

FOREIGN PATENT DOCUMENTS

| | | |
|---|---|---|
| 0 064 558 | 11/1982 | European Pat. Off. . |
| WO94/00852 | 1/1994 | WIPO . |

OTHER PUBLICATIONS

Mitsubishi Metal Corporation, Electrically Conductive Resin Composition, *Patent Abstracts of Japan,* vol. 13 No. 417 (C–636) [3765], 14, Sep. 1989.

Fujikura Ltd., Electrically Conductive Ultraviolet Curing Paint, *Patent Abstracts of Japan,* vol. 11 No. 326 (C–454) [2773], 23 Oct. 1987.

*Primary Examiner*—Marie Yamnitzky

[57] ABSTRACT

Transparent electroconductive coating compositions, methods to prepare such coating compositions, and substrates coated with these coating compositions. The coatings are based on polymeric resins containing finely dispersed electroconductive powders. The coatings can be characterized by the following: thermoformable while retaining transparency and electrical conductivity that is insensitive to humidity; low chloride extractability, stable to exposure to isopropanol or water/soap solutions.

12 Claims, No Drawings

TRANSPARENT, STATIC-DISSIPATIVE FORMULATIONS FOR COATINGS

This is a division of application Ser. No. 08/292,668 filed Aug. 18, 1994, now U.S. Pat. No. 5,631,311.

FIELD OF THE INVENTION

The present invention relates to transparent electroconductive coating compositions, methods to prepare such coating compositions, and substrates coated with these coating compositions. The coatings are based on polymeric resins containing finely dispersed electroconductive powders. In one aspect of the invention, the coatings are characterized by the following: thermoformable while retaining transparency and electrical conductivity that is insensitive to humidity; low chloride extractability, stable to exposure to isopropanol or water/soap solutions.

BACKGROUND OF THE INVENTION

U.S. Pat. No. 4,431,764 describes coating compositions comprising an electroconductive powder of tin oxide and antimony wherein the antimony is present as antimony oxide, and a thermoplastic or thermosetting binder resin.

U.S. Pat. No. 4,571,361 describes antistatic transparent plastic films which are conductive at low humidity having high mechanical strength. The coating composition comprises an electroconductive powder which is comprised of at least one crystalline oxide of Zn, Ti, Sn, In, Si, Mo or W of particle size 0.01–0.7 microns which can include dopants such as Al, In, Nb, Ta, Sb, at concentrations of 0.01–30 mole %.

U.S. Pat. No. 4,734,319 describes a transparent plastic molded article in the form of a sheet or film or various molded articles produced by injection or press molding which has on its surface (a) an electrically conductive coating layer that is transparent, containing 60–80% of an electroconductive powder, 0.2 microns or less in particle size; 20–40% of a solvent or emulsion type resin, a transparent film forming coating composition capable of forming a cross linking-hardened resin film, hardenable with light, energy or heat and (b) a topcoat containing 0–50% by weight of conductive powder and 50–100% by weight of a resin.

U.S. Pat. No 5,204,177 describes a conductive coating composition consisting of a solution or dispersion in a solvent of conductive fine particles of tin or indium oxide and a binder resin.

The disclosure of the previously identified U.S. patents is hereby incorporated by reference.

CROSS-REFERENCE TO COMMONLY ASSIGNED PATENTS AND PATENT APPLICATIONS

The electroconductive powder that may be produced in the instant invention is described in greater detail in U.S. Pat. Nos. 5,071,676, and 5,236,737. If desired the precipitation process described in U.S. patent application Ser. No. 08/218,874, filed on Mar. 25, 1994, which is a continuation in part of Ser. No. 07/905,980, filed on Jun. 28, 1992, entitled "Electroconductive Material and Process" (corresponding to PCT patent application Publication No. US93/05720) can be used for making antimony doped tin oxide.

The instant invention can also employ the doped tin oxide powders described in U.S. patent application Ser. No. 08/292,895 (Attorney's Docket Number CH-2438), filed on even date herewith, entitled "Tin Oxide Based Conductive Powders and Coatings", filed in the names of Bergmann et al. (now U.S. Pat. No. 5,569,412). The doped tin oxide powder can be obtained by using a precipitation method wherein the powder is substantially free of antimony and/or pyrochlore. Ser. No. 08/292,895 (Attorney's Docket Number CH-2438) describes films incorporating electroconductive powders consisting essentially of tin oxide which has been doped with at least one of tantalum, niobium, and phosphorus.

The disclosure of the previously identified patents and patent applications is hereby incorporated by reference.

SUMMARY OF THE INVENTION

The electroconductive coatings of the present invention are particularly useful in packaging materials which can be used, for example, to transport electronic parts.

Sensitive electronic parts, such as disc drives, computer chips, among other items, need to be protected from electrostatic discharge (ESD) during all steps of their fabrication, shipment and final use-assembly. In the absence of a dissipative material, an electrostatic charge can build-up and its subsequent rapid discharge can damage sensitive electronic parts. Consequently, it would be desirable for plastic shipping containers to possess static dissipative characteristics thereby reducing, if not eliminating, ESD damage of the parts during shipment. In some cases, it is desirable that such shipping containers be sufficiently transparent to allow inspection of the contents without opening the package.

Static dissipative characteristics can be imparted by providing an electroconductive surface. Electroconductive powders (ECPs) can be incorporated into shipping containers by including such powders with the plastic prior to forming the containers, that is, by volume filling the plastic with the conductive powders or by coating a plastic sheet or substrate. The process to form a plastic sheet that has been volume filled with conductive powder requires much higher loadings of powder than is used in a conductive coating on a plastic substrate to achieve the same level of conductivity. Therefore, use of electroconductive coatings is much less expensive than volume filling methods. Furthermore, shipping containers that are volume filled with a conductive powder are not as transparent at the same level of conductivity as are shipping containers that have thin electroconductive coatings.

The fabrication procedures for the manufacture of such transparent shipping containers frequently require thermoforming of coated plastic sheet. This is done in a press equipped with suitable heating devices to make the sheet soft and pliable before it is molded. In the interest of manufacturing efficiency, it is desirable to apply the conductive coating to the plastic sheet before the sheet is thermoformed into the desired shape. This means that the transparent, conductive coating on the plastic sheet must be capable of surviving the thermoforming operation without losing conductivity or transparency.

There are additional important requirements for such coatings in electronic packaging. For example, it is desirable for the coatings to avoid emitting or exuding significant amounts of anions, such as chloride, fluoride, sulfate, among other undesirable anions, because these anions can be highly corrosive and otherwise detrimental to the delicate electronic parts shipped in such plastic container. For best results, the presence of chloride anions is minimized, e.g., about 2.0 to less than about 0.5 ppm of extractable chlorides.

There is an increasing trend for economic and environmental reasons to re-use the previously described containers numerous times. Such re-use involves washing empty, returned containers in an aqueous wash solution and, frequently, also in isopropanol and similar washing media. Consequently, it is desirable for the coatings to be resistant to these washing media in order to be re-usable.

Another desired feature of such coatings is that the electrical conductivity should not change significantly as a function of relative humidity.

The present invention provides transparent electroconductive coating compositions comprising or consisting essentially of electroconductive powders and a thermoplastic or thermosetting resin and optionally, a dispersant, in a solvent system.

The process to prepare the coatings of this invention involves milling together the coating composition comprising conductive powder, resin, dispersant, and solvent wherein a relatively stable dispersion is produced. By "stable" dispersion, it is meant that the dispersion is resistant to reagglomeration of the ECPs within the dispersion. The stable dispersions have a relatively long shelf-life thereby permitting the production of an electroconductive coating having a consistent transparency and conductivity over a period of an extended time, e.g., the dispersion is stable for more than about 2 months.

In one aspect of the invention, an electroconductive coating of this invention is comprised or consists of a suitable low chloride containing electroconductive powder, at least one polyester resin, at least one polyester-polyamine copolymer dispersant and at least one solvent.

The present invention also provides substrates coated with the electroconductive coatings which can undergo thermoforming while remaining sufficiently electrically conductive and transparent. By "thermoforming" it is meant that a coated substrate, which is generally planar, is shaped by being heated and molded into a virtually unlimited array of configurations.

DETAILED DESCRIPTION

Conductive coatings prepared by conventional methods over time, these conventional coatings, may turn opaque and lose transparency or may lose their conductivity. Transparency and conductivity may also be lost when coated substrates are exposed to low humidity conditions or high temperatures and/or mechanical stress such as those used in thermoforming, e.g., a coating containing a quarternary amine or salts thereof.

There is a need for coatings with electrical conductivity and transparency that are capable of withstanding thermoforming, insensitive to humidity, resistant to abrasion by scuffing or scratching, stable to washing, and have low chloride extractability. In addition, the dispersions desirably have a good shelf life, and can be employed for making coatings that avoid becoming opaque or non-conductive. Such electroconductive coatings are provided for in the present invention thereby solving the problems associated with conventional coating methods.

The electroconductive coatings of this invention are comprised or consist of fine particles of an electroconductive powder, a thermoplastic or thermosetting resin, an organic solvent and optionally, a polyester dispersant and other additives. Such coatings can be applied to plastic substrates which, after thermoforming, can be used as packaging for electronic parts.

An electroconductive coating of this invention contains from about 30 to about 70% by weight of at least one suitable electroconductive powder based on the total weight of the dry coating. If desired, commercially available antimony containing tin oxide powders can be employed. Such commercially available powders typically contain about 10 to about 30 wt % antimony. Electroconductive powders also include those comprised of fine particles of conductive oxides that can be doped with other oxides which improve their conductivity. Examples of suitable electroconductive powders are described in Ser. No. 08/292,895 (Attorney's Docket No. CH-2438); which was incorporated by reference. Such conductive powders can include tin oxide which has been doped with antimony, tantalum, niobium, or phosphorus.

The level of dopant present in the tin oxide can range from 0.25 to 15% based on the weight of tin oxide.

For the coatings of this invention to be transparent, the conductive powder is preferably comprised mostly of fine particles of size less than about 0.20 microns, that is smaller than half the wavelength of visible light.

Electroconductive powders or mixtures thereof useful in this invention must have sufficient conductivity to provide the coatings with surface resistivities within the static dissipative range, which is $10^5$ to $10^{13}$ ohms/square. The dry powder resistivities of the conductive powders are preferably within the range of from about 0.1 to about 1,000 ohm-cm.

While there are numerous methods that can be used to prepare electroconductive powders that fit within the above criteria of composition, particle size and resistivity, powders prepared by methods which involve precipitation of metal oxides or doped metal oxides from aqueous acidic media are particularly useful. Such conductive powders can be produced by using the precipitation process described in for example, U.S. Pat. No. 5,236,737; the teachings of which are incorporated herein by reference.

Electroconductive powders with very low concentrations of chloride, that is, less than 100 ppm of extractable chlorides in the powder, are particularly useful in the present invention. Such low chloride levels can be achieved, for example, by washing powders with relatively high chloride concentration, e.g., greater than 400 ppm chloride, with a sufficient quantity of deionized water. The conductive powders can be washed with deionized water for example, as received from the manufacturer or prior to calcining a precipitated metal oxide.

An electroconductive coating of this invention contains from about 30 to about 70% by weight of at least one thermoplastic or thermosetting binder resin based on the weight of the dry coating. Useful resins can include any suitable material such as polyester, acrylic, urethane, mixtures thereof, among others. Typically, saturated copolyester resins are preferred because such resins can possess superior adhesion properties and the ability to withstand thermoforming without causing significant changes in the resistivity or transparency of the coatings. The resin may be either waterborne or solvent borne. Pigment, i.e., electroconductive powder, to binder ratios in the range of about 1:1.25 to about 2:1 (P:B) provide excellent combinations of high transparency and electrical conductivity/resistivity.

A desirable optional component of the conductive coatings of this invention comprises or consists of at least one polyester-polyamine copolymer dispersant. This dispersant can be present at a concentration of about 2 to about 15% by weight based on the weight of the conductive powder. The dispersant inhibits reagglomeration of the particles of the conductive powder and improves stability to thermoforming of the coated substrate. The dispersant also provides the coatings with an ease of dilution and improves the stability of the dispersion over time. Such dispersants include, for example, Hypermer KD1 or KD2 (R) (available from ICI) and Solsperse24000sc or 20000 (R) (available from Zeneca) dispersants, among others.

The electroconductive coating compositions of this invention are normally dispersed in one or more solvents. Any solvent or combination of solvents capable of dissolving or diluting the binder resins can be used including for example, ketones, alcohols, esters, ethers, aromatic hydrocarbons, among others. A mixture of methylethylketone and toluene is particularly desirable when dissolving the polyester resins with a polyester dispersant. The amount of solvent present in the coating is typically from about 45 to about 90% based on the total weight of the dispersion.

In addition to the electroconductive powder, resin, dispersant, and solvent, there can be other additives present in the electroconductive coating compositions of this invention. These additives can include at least one member of the group consisting of plasticizers, leveling agents, dyes, pigmenting materials, among others. The amount of additives present in the coating composition is usually no more than about 20% by weight of the dispersion.

The electroconductive coatings of the present invention can be formulated by mixing the compositions using dispersion methods that include ball milling, sand milling, and various types of media milling such that the particle size is reduced to below about 0.2 microns. Suitable milling media include ceramics, especially hard ceramics such as zirconia and alumina.

The transparent electrically conductive coatings of the present invention can be applied to substrates by known coating methods, for example, using doctor blades, bird applicators, wire wound rods; also gravure, slot and die, extrusion, spray and dipping methods can be used. The coatings are thin, typically about 0.5 to 20 microns in thickness. Surface resistivities of the coatings as measured by using a commercially available Dr. Thiedig Milli-to-2 current/resistance meter (Monroe Electronics, Lyndonville, N.Y.) are typically less than $10^{13}$ ohms per square.

The coatings can be applied to a variety of different substrates including, for example, polyester, cardboard, glass, polycarbonate, steel, polystyrene, concrete, plastics, among others. In particular, plastic substrates that have been coated with the conductive coatings such that the coated plastic substrate can be thermoformed at temperatures typically from 175 to 350 degrees F. The thermoformed plastic substrates can be used to provide packaging containers for electronic parts. The specific temperature which is used for thermoforming the coated substrate is dependent upon the physical characteristics of the substrate.

In one aspect of the invention, the thermoforming process is performed in a press equipped with suitable heating devices to soften the coated plastic sheet thereby making the coated plastic sheet pliable so the sheet can be molded into a desired shape. Typically, it is preferred to apply an electroconductive coating to a plastic sheet prior to thermoforming. Therefore, the plastic sheet must be able to retain its conductivity and transparency after undergoing thermoforming.

The coatings of the present invention are electrically conductive and transparent. Transparency is determined by haze measurements using a Hunter ColorQuest Instrument. A haze value of about 60% or less characterizes the coatings as being transparent.

While particular emphasis has been placed upon certain components of the dispersion, other additives which can be added to the conductive coatings of this invention include coupling agents, leveling agents, photosensitizers, antioxidants, ultraviolet light absorbers, various stabilizers, rheology control agents, among other additives.

The electroconductive coatings of the present invention are illustrated in more detail in the examples which should not be construed as limiting in any way the scope of the invention. Unless stated to the contrary, composition is on a weight percentage basis.

EXAMPLE 1

A dispersion of an antimony containing tin oxide electroconductive powder (sold under the trademark "ZELEC" 3010 XC by the DuPont Company, Wilmington, Del.) was made in a solution of polyester resin and methylethylketone (MEK) by the following procedure.

Approximately 18.2 grams of a linear, saturated copolyester resin (Vitel 2200 available from Shell Chemical Co.), were dissolved into about 60.0 grams of MEK (water-free) and 21.8 grams of the ECP powder was dispersed in the polyester/MEK solution using a standard laboratory stirrer. This composition corresponded to a Pigment to Binder ratio of about 120:100 and a solids content of about 40%. The composition was then transferred to a small laboratory-size, horizontal media mill (available from Eiger Machinery Co.) and milled at about 4000 revolutions per minute for approximately 1 hour and 30 minutes.

The resultant dispersion was discharged from the mill and transferred to a closed glass container to avoid evaporation of the MEK solvent. The viscosity of the dispersion was measured and found to be about 160 centipoise (Brookfield Instrument, 20 rpm).

Draw-down coatings were made from the dispersion on both sides of 0.030 inch thick polyethyleneterephthalateglycol (PETG) sheets using a #5 standard wire-wound steel rod to produce the coatings. The coatings were air-dried for about 15 minutes followed by oven-drying for approximately 30 minutes at 60 degrees C.

The dried coatings were transparent, i.e., about 29% Haze, and conductive, i.e., about $10^8$ ohms/square surface resistivity that is well within the static dissipative range.

The double coated PETG sheets were thermoformed by placing the sheet into a 450 degree F. oven until the temperature of the sheet reached about 240 degrees F. that corresponded to about 38 seconds dwell time. The sheet was vacuum molded at about 40 psi into a box-shaped container that measured about 4×6×1 inches.

The thermoformed box retained good transparency, about 35% haze, and good electrical conductivity, about $10^9$ ohms/square.

EXAMPLE 2

Approximately 107.5 grams of a 40 wt % solution in MEK of a linear, saturated copolyester resin, (Vitel 2700 available from Shell Chemicals), was mixed with an additional 120.7 grams of MEK and 46.3 grams of toluene. To this solution was added 56.2 grams of an electroconductive powder (sold under the trademark "ZELEC"-3010-XC). This mixture was milled in a Union Process 01 research attritor using 0.8–1.0 mm zirconium silicate beads at about 500 rpm for 24 hours to provide a dispersion of finely divided particles of the conductive powder.

The milled dispersion was used to coat polyester substrates by using a #5 wire-wound rod. Table 1 below provides a summary of the properties of the coated substrates prepared from this dispersion over a period of several days.

TABLE 1

| Day | Rm(1) | Trans., %(2) | Haze, % | Viscosity(3) |
|-----|-------|--------------|---------|--------------|
| 0 | $1 \times 10^7$ | 85 | 20 | |
| 0 | $5 \times 10^6$ | 88 | 25 | |
| 1 | $2 \times 10^7$ | 87 | 25 | |
| 4 | | | | 90 |
| 5 | $2 \times 10^6$ | | | |
| 6 | $1 \times 10^6$ | 89 | 28 | |
| 7 | $3 \times 10^6$ | 92 | 54 | |
| 8 | $4 \times 10^8$ | | | |
| 11 | $2 \times 10^7$ | "opaque" | | 500 |

(1)Surface resistivity in ohms/square as measured by using a Monroe probe.
(2)Transmittance
(3)Viscosity in centipoise at 100 rpm as measured on a Brookfield Viscometer

EXAMPLE 3

A dispersion was prepared by mixing approximately 107.7 grams of a solution containing 40 wt % Vitel 2200 in MEK with about 121.0 grams of additional MEK and 46.3 grams of toluene and 56.4 grams of an electroconductive powder (sold under the trademark "ZELEC"-3010-XC). This mixture was milled substantially in accordance with the method described in Example 2.

The milled dispersion was used to coat polyester and PETG substrates using a #5 wire-wound rod. Table 2 below provides a summary of the properties of the coated substrates prepared from this dispersion over a period of several days.

TABLE 2

| Date | Rm(1) | Trans., %(2) | Haze, % | Viscosity(3) | Substrate(4) |
|------|-------|--------------|---------|--------------|--------------|
| 0 | $1 \times 10^9$ | 83 | 13 | | Polyester |
| 0 | $7 \times 10^7$ | 87 | 17 | | Polyester |
| 1 | $3 \times 10^9$ | 87 | 17 | | Polyester |
| 4 | | | | 70 | |
| 5 | $6 \times 10^6$ | 88 | 17 | | Polyester |
| 6 | $4 \times 10^6$ | | | | PETG |
| 7 | $2 \times 10^6$ | 88 | 16 | | Polyester |
| 8 | $1 \times 10^6$ | | | | Polyester |
| 11 | $3 \times 10^9$ | "opaque" | | 500 | Polyester |

(1)Surface resistivity in ohms/square as measured by using Monroe probe.
(2)Transmittance.
(3)Viscosity in centipoise as measured at 100 rpm by using a Brookfield Viscometer.
(4)Substrate used for coating.

EXAMPLE 4

An antimony containing tin oxide electroconductive powder (sold under the trademark "ZELEC" 3010-XC) was washed with deionized water to less than 100 ppm of extractable chlorides as determined by the following test. Approximately 30 grams of the extracted powder was mixed with about 100 grams of deionized water at 185 degrees F. for 1 hour to form a slurry. The slurry was filtered through a Buchner funnel. The filtrate was measured for concentration of extractable chloride with an Orion model 290A Chloride Ion Selective Probe meter. The concentration of chloride was adjusted for dilution and was determined to be about 70 ppm of extractable chloride in the powder form.

Next, Vitel 2700 copolyester resin was dissolved in MEK solvent to form a solution. Toluene and a polyester/polyamine copolymer dispersant, (Hypermer KD2 available from ICI Specialty Chemicals) were added to the solution. Finally, the previously described low chloride, antimony containing tin oxide electroconductive powder was added. The composition of this mixture was 17 wt % ECP-3010-XC, 12 wt % Vitel 2700, 1 wt % Hypermer KD2, 56 wt % MEK, and 14 wt % toluene.

The mixture was milled substantially in the same manner as in Example 2. The milled dispersion was used to coat a polyester substrate, Mylar GA-10 (available from DuPont), using a #5 wire-wound rod. The coated Mylar had a surface resistivity of about $9.0 \times 10^6$ ohms/square with a haze value of 6.9% and transmittance of 85%. (The uncoated substrate had 1% haze and 89% transmittance).

EXAMPLE 5

Example 4 was substantially repeated with an antimony containing tin oxide powder, Zelec ECP-3010-XC that was not washed to reduce the level of extractable chlorides. This powder contained about 700 ppm of extractable chlorides. The composition of the mixture was the substantially same, 17 wt % ECP-3010-XC containing 700 ppm of extractable chloride, 12 wt % Vitel 2700 resin, 1 wt % Hypermer KD2 dispersant, 56 wt % MEK and 14 wt % toluene.

The mixture was milled in a 1.4 liter horizontal media mill for 13 passes at a flow rate of 2.5 gallons per hour using by 0.8–1.0 mm zirconium silicate beads. The milled dispersion was used to coat a Mylar GA-10 polyester substrate using a #5 wire-wound rod. The coated Mylar had a surface resistivity of about $10^5$ ohms/square with a haze value of 7.58% and transmittance of 82%.

EXAMPLE 6

The reduced chloride, milled dispersion substantially as described in Example 4 was used to coat both sides of a 0.030 inch thick PETG using a 0.0012 bird applicator. The surface resistivity of the coated PETG was about $1.0-10^7$ ohms/square with haze of 15% at transmittance of 35%.

The double-coated PETG sheet was thermoformed by heating the sheet in a 450 degree F. oven to a sheet temperature of 250 degrees F. The dwell time to reach this temperature was 40–45 seconds. The forming pressure was 40 psi and the mold vacuum was at 25 inches Hg. The coated PETG sheet was thermoformed into a box shape with a draw ratio of 0.25. The box measured about 4×6×1 inches. After thermoforming, the surface resistivity was $1.0 \times 10^8$ ohms/square with 21% haze and transmittance of 55%.

The concentration of extractable chloride in the coated substrate was determined by heating a 3 gram sample of the coated substrate after thermoforming in 20 grams of deionized water at 185 degrees F. for 1 hour. The concentration of chloride in the solution was measured with an Orion model 290A Chloride Ion Selective Probe meter. The chloride concentration was adjusted and based on the total weight of the coated substrate. The level of extractable chloride found in the coated substrate was determined to be less than 0.3 ppm whereas the expected level was 0.7 ppm (based on 1 wt % conductive powder present in the coated substrate).

EXAMPLE 7

The dispersion substantially as described in Example 5 containing an antimony containing tin oxide powder containing 700 ppm of extractable chloride was used to coat both sides of a 0.030 inch thick PETG using a 0.0012 bird applicator. The surface resistivity of the coated PETG was $10^6$ ohms/square.

The coated substrate was thermoformed in the same manner as in Example 6. The surface resistivity of the thermoformed coated PETG substrate was $10^7$ ohms/square.

The level of extractable chloride found in the coated substrate was determined to be 1.2 ppm whereas the expected level was 7 ppm (based on 1 wt % conductive powder present in the coated substrate).

EXAMPLE 8

The performance of the dispersion substantially as prepared in Example 4 for coating substrates was examined over a period of several weeks to monitor the stability of the formulation. More than 11 weeks after formulation, the dispersion substantially as described in Example 4 was used to coat a Mylar GA-10 polyester substrate using a #5 wire-wound rod. The coated substrate had a surface resistivity of $8.0 \times 10^5$ ohms/square and haze of less than 10%, indicating essentially no deterioration of the dispersion over this time period.

EXAMPLE 9

Following substantially the same procedure as in Example 4, a dispersion was prepared with the following composition: approximately 21 wt % ECP-3010-XC, 12.3 wt % Vitel 2700, 1.7 wt % Hypermer KD2, 52 wt % MEK, and 13 wt % toluene. This mixture was milled by substantially the same process as in Example 2 to provide a dispersion with 35% solids at a pigment:binder (P:B) ratio of 1.5:1. The milled mixture was split into two dispersions, namely "A" and "B".

Dispersion "A"—Sample A was mixed with additional solvent, MEK to reduce solids to about 30%.

Dispersion "B"—Sample B was mixed with a 40 wt % solution of Vitel 2700 in MEK and additional MEK to reduce the solids content to 30% and the P:B ratio to 1.3:1.

The dispersions A and B remained stable for more than about 3 weeks after the additions as evidenced by the performance of coatings, which were made from the dispersions, upon Mylar sheets. The dispersions A and B were used to coat Mylar sheets using a #5 wire-wound rod. Surface resistivities of the coated Mylar were below $2 \times 10^6$ ohms/square and haze values were less than 8%.

COMPARATIVE EXAMPLE 10

A dispersion was; prepared following substantially the same procedure and formulation as in Example 2. No dispersant was present in this formulation. Adding MEK to this dispersion caused instant shock to the system thereby resulting in flocculation of the pigment and resin and separation from solution.

EXAMPLE 11

Vitel 2700 copolyester resin was dissolved in MEK solvent. Toluene and Hypermer KD2 dispersant were added to the solution. Lastly, a phosphorus containing tin oxide electroconductive powder, containing 3 wt % phosphorus, prepared in substantially in accordance with Example 6 of U.S. patent application Ser. No. 08/292,895 (Attorney's Docket Number CH-2438), was added to the solution. The composition of this mixture was approximately 17 wt % phosphorus containing tin oxide conductive powder, 11.5 wt % Vitel 2700, 1.5 wt % Hypermer KD2, 56 wt % MEK and 14 wt % toluene.

The mixture was milled in substantially the same manner as Example 2. The milled dispersion was used to coat a polyester substrate using a #5 wire-wound rod. The coated substrate had a surface resistivity of $2.6 \times 10^8$ ohms/square with a haze value of 9.6% and transmittance of 86%.

While certain aspects of this invention have been described in particular detail, a skilled person in this art would understand that many other embodiments are encompassed by the appended claims.

The following is claimed:

1. A shaped coated substrate having an electroconductive and substantially transparent coating upon said substrate, wherein said substrate is selected from the group consisting of polyester, cardboard, glass, polycarbonate, steel, polystyrene, concrete, and thermoformable plastic, and wherein said coating consists essentially of from about 30 to about 70 weight percent of at least one electroconductive powder based on weight of dry coating, a thermoplastic or thermosetting resin, and at least one polyester-polyamine dispersant.

2. A transparent and electroconductive coating composition consisting essentially of about 30 to about 70 weight percent of at least one electroconductive powder based on weight of dry coating composition, a thermoplastic or thermosetting resin, at least one polyester-polyamine dispersant, and a solvent.

3. The coating composition of claim 2 wherein said coating composition contains less than about 3 ppm of extractable chlorides.

4. The coating composition of claim 2 wherein the electroconductive powder is tin oxide containing at least one member selected from the group consisting of phosphorus, antimony, niobium, and tantalum.

5. The coating composition of claim 2 wherein said resin is at least one member selected from the group consisting of a polyester, acrylic, urethane and mixtures thereof.

6. The coating composition of claim 5 wherein said resin is a copolyester resin.

7. The coating composition of claim 2 wherein the solvent is at least one member selected from the group consisting of ketones, alcohols, esters, ethers, and aromatic hydrocarbons.

8. The coating composition of claim 7 wherein the solvent is at least one of methylethylketone and toluene.

9. The coating composition of claim 2 to which has been added at least one member selected from the group consisting of plasticizers, leveling agents and dyes.

10. The coating composition of claim 2 to which has been added at least one member selected from the group consisting of coupling agents, leveling agents, photosensitizers, antioxidants, ultraviolet light absorbers, and rheology control agents.

11. The coating composition of claim 2 wherein the electroconductive powder particle size is less than about 0.20 microns and said powder has a dry powder resistivity of about 0.1 to 1,000 ohms-cm.

12. The coating composition of claim 2 consisting essentially of a tin oxide containing antimony, a saturated copolyester resin, at least one polyester-polyamine copolymer dispersant, and a mixture of methylethylketone and toluene.

* * * * *